May 21, 1940.  F. A. LALLIER  2,201,904
HOOK FOR CARGO SLINGS
Filed Aug. 3, 1939
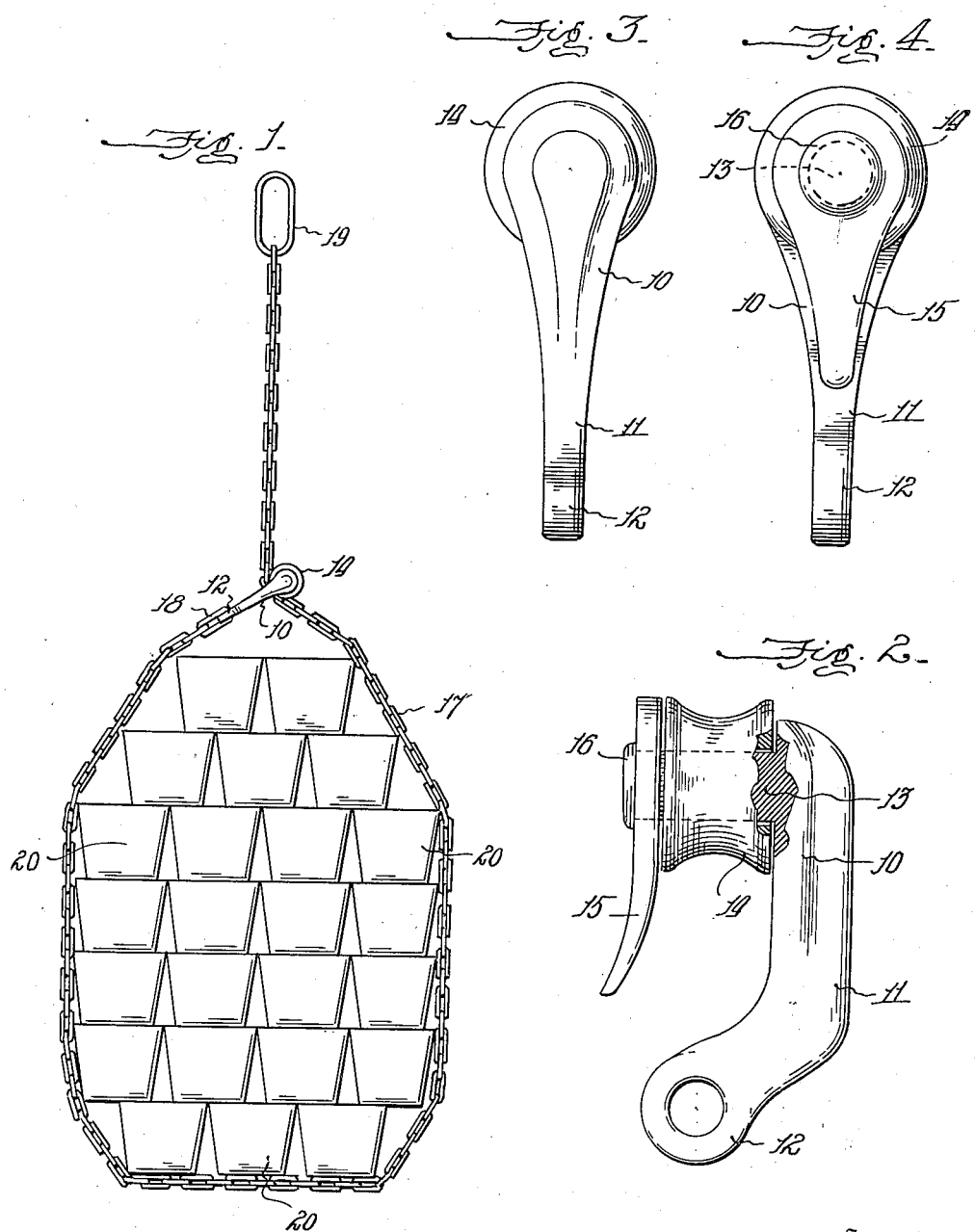
Inventor;
F. A. Lallier
By Horace S. Mead
Attorney Patented May 21, 1940

2,201,904

UNITED STATES PATENT OFFICE 2,201,904

HOOK FOR CARGO SLINGS

Frank A. Lallier, Brownsville, Tex.

Application August 3, 1939, Serial No. 288,225

1 Claim. (Cl. 294—74)

My invention is an improvement in hooks of that special type which are used in connection with a chain or cable in providing a sling for loading and unloading cargo.

In handling cargo it is customary to pass a chain or cable around the shipment or goods to be loaded on to a ship or unloaded therefrom, and in handling a group of small articles, such as billets of lead, the chain or cable is provided at one end with a hook to form a slip noose which will be tightened by the weight of the load. In handling cargo of this character the binding action of the noose is not always effective when an ordinary hook is used in connection with the length of chain or cable, resulting sometimes in accidental releasing of the load during its passage from the wharf to the ship, or vice versa, and such accidents occur more often when a chain is employed as the binding element for the reason that the links catch in the hook.

The main purpose of my invention therefore is to provide a particular construction of hook for cargo slings which will cooperate with a chain or cable to more effectively confine the goods within the slip noose by allowing the chain or cable to readily pass over the crook or curved portion of the hook as the noose is tightened around the goods in transferring the same.

A further object of my invention is to provide a hook for this special work which will be strong and durable in construction to withstand the handling of heavy articles, as for instance a large number of billets of lead, thus facilitating the operation of loading and unloading cargoes.

With these principal objects in view my invention consists in providing a special form of hook for cargo slings in which a grooved anti-friction roller forms a part of the crook or curved portion of the hook, in association with a guard member cooperating with the body portion and shank to prevent the chain or cable from becoming accidentally dislodged from the hook, as hereinafter described and more specifically set forth in the appended claim.

In the drawing:

Figure 1 is an elevation illustrating the application of my improved form of hook for cargo slings in handling billets of lead.

Fig. 2 is a detail side elevation, partly in section, showing the particular construction of the hook.

Fig. 3 is a rear view of the hook, and

Fig. 4 is a front view thereof.

The several parts of the hook are preferably made of forged steel, and in the construction thereof there is a body portion 10 bent inwardly at one end to form the shank 11 and eye 12, and provided at its opposite or outer end with a gudgeon 13, to receive a grooved roller 14 and guard member 15, the latter being welded to the outer end of said gudgeon, as indicated at 16.

The gudgeon is formed integrally with the body portion of the hook, as illustrated in Fig. 2 of the drawing, and to increase the stability of the hook, as well as provide a bearing for the inner end of the grooved roller, this part of the body portion is of greater width and thickness than the major portion thereof, tapering laterally and towards the outer end as illustrated in Figs. 2 and 3, with the outer end or shank narrowed in width and apertured to form the eye of the hook.

As hereinbefore mentioned the body portion 10, gudgeon 13, and shank having the eye 12 are forged from a single piece of steel, and after the roller is mounted on the gudgeon the guard member 15, having an opening to receive the gudgeon, is secured to the outer end of said gudgeon, preferably by welding, so that the guard member not only holds the roller in place but also provides a guard to prevent the chain or cable from becoming dislodged from the hook. The portion of the guard projecting beyond the inner side of the roller is curved slightly outward and is of a length to leave an entrance opening for the chain or cable between the outer end of said guard and adjoining shank of the hook. This particular construction provides a sturdy hook especially adapted for use in connection with a cargo sling, and it will be obvious that the roller not only permits the chain or cable to slip easily through the hook by rotation of the grooved roller over which it passes, but will also reduce wear on the chain or cable to a minimum.

In the use of a chain with an ordinary hook, to provide a cargo sling, there is considerable wear on the links of the chain where it passes over the crook or curved end of the hook, and by providing the crook with an anti-friction roller there is a material saving in the life of the chain, and in this instance the sturdiness of the hook, constructed in accordance with my invention, is also of great importance.

In using my improved hook in association with a cargo sling or slip noose it is attached to one end of a chain, 17, or other flexible connection, in the usual manner by link 18, with the other or free end of the chain provided with a large loop 19 for the engagement of a grabhook employed at the end of a hoisting cable (not shown), and it will be obvious that when the load is lifted the chain will readily slip through the hook by turning of the groove roller over which it passes to thereby allow the chain to be drawn tightly around the cargo. The sturdy construction of the hook also adds materially to the effectiveness of the sling or slip noose as it will withstand service to a greater extent than a hook of ordinary construction.

I claim:

A hook for use in connection with cargo slings comprising a body portion one end of which is rounded to provide a bearing surface at one side thereof and the other end curved inwardly and terminating in an eye for attaching the hook to a chain or other flexible connection forming the cargo sling, a stout gudgeon formed integrally with the body portion from which it projects outwardly at the center of the aforementioned bearing surface, a grooved roller mounted for rotation on the gudgeon, and a guard member welded on the outer end of the gudgeon for retaining the roller thereon, said guard member having a tapered projection extending parallel with the body of the hook beyond the periphery of the roller towards the attaching eye leaving an entrance opening for the chain or flexible connection.

FRANK A. LALLIER.